United States Patent
Liu et al.

(10) Patent No.: US 12,279,354 B1
(45) Date of Patent: Apr. 15, 2025

(54) SPLICING-LAMP LIGHTING-EFFECT APPLICATION, PLAYBACK METHOD, DEVICE, SYSTEM, AND STORAGE MEDIUM

(71) Applicant: Shenzhen Intellirocks Tech. Co., Ltd., Shenzhen (CN)

(72) Inventors: Shijie Liu, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 18/896,081

(22) Filed: Sep. 25, 2024

(30) Foreign Application Priority Data

Oct. 13, 2023 (CN) .......................... 202311324589.6

(51) Int. Cl.
G06F 3/04847 (2022.01)
H05B 47/175 (2020.01)

(52) U.S. Cl.
CPC ....... *H05B 47/196* (2024.01); *G06F 3/04847* (2013.01)

(58) Field of Classification Search
None
See application file for complete search history.

(56) References Cited

U.S. PATENT DOCUMENTS 9,433,066 B2 * 8/2016 Burkhart ................ H05B 45/10
2005/0275626 A1 * 12/2005 Mueller ................. H05B 47/19
345/156
2012/0178528 A1 * 7/2012 Brunell ................... G07F 17/34
463/31
2016/0088708 A1 * 3/2016 Anthony ............... H05B 47/16
315/294
2016/0370981 A1 * 12/2016 Peng .................. H05B 47/1985

FOREIGN PATENT DOCUMENTS

CN 116761302 A 9/2023

* cited by examiner

*Primary Examiner* — Tuan S Nguyen
(74) *Attorney, Agent, or Firm* — Wenye Tan

(57) ABSTRACT

A splicing-lamp lighting-effect application method includes displaying a plane composition of a target splicing-lamp, which includes form patterns corresponding to multiple lamp blocks of the target splicing-lamp and each form pattern includes multiple light-emitting areas; loading effect configuration information corresponding to each layer described in a lighting-effect template into a lighting-effect editing area for display; in response to a layer on-top event, marking the effective light-emitting area in the form pattern of each lamp block according to the area information of a current layer set-on-top, obtaining a plane topological pattern corresponding to the current layer, and applying the lighting-effect information of the current layer to the plane topological pattern to display a preview lighting effect of the current layer; and responding to a lighting-effect application instruction, encapsulating edited effect configuration information of each layer in a lighting-effect application package, and pushing it to the target splicing-lamp.

18 Claims, 5 Drawing Sheets

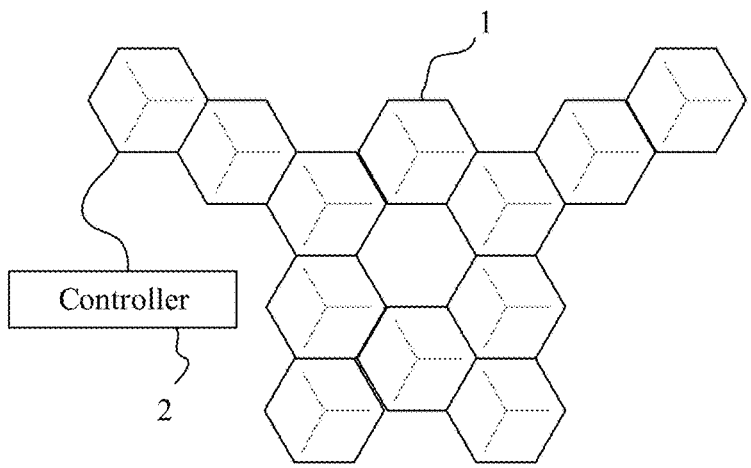

FIG. 1

```
┌─────────────────────────────────────────────────────────┐
│ Display a plane composition of a target splicing-lamp,  │  S5100
│ the plane composition including the form patterns       │
│ corresponding to the multiple lamp blocks of the target │
│ splicing-lamp, and each form pattern including multiple │
│ light-emitting areas                                    │
└─────────────────────────────────────────────────────────┘
                          │
                          ▼
┌─────────────────────────────────────────────────────────┐
│ Load the effect configuration information corresponding │  S5200
│ to each layer described in the lighting-effect template │
│ into the lighting-effect editing area for display, the  │
│ effect configuration information including area         │
│ information and lighting-effect information, the area   │
│ information being used to specify the effective light-  │
│ emitting areas of the lamp block, and the lighting-     │
│ effect information being used to describe the lighting- │
│ effect process applied on the effective light-emitting  │
│ areas                                                   │
└─────────────────────────────────────────────────────────┘
                          │
                          ▼                                  S5300
┌─────────────────────────────────────────────────────────┐
│ In response to a layer on-top event, determine and mark │
│ the effective light-emitting areas of the form pattern  │
│ of each lamp block in the plane composition according   │
│ to the area information of the current layer that is    │
│ set on top, obtain the plane topological pattern        │
│ corresponding to the current layer, and apply the       │
│ lighting-effect information of the current layer to the │
│ plane topological pattern to display a preview lighting │
│ effect of the current layer                             │
└─────────────────────────────────────────────────────────┘
                          │                                  S5400
                          ▼
┌─────────────────────────────────────────────────────────┐
│ Respond to a lighting-effect application instruction,   │
│ encapsulate the edited effect configuration information │
│ of each layer in a lighting-effect application package, │
│ and send it to the target splicing-lamp for application │
└─────────────────────────────────────────────────────────┘
```

FIG. 2

SPLICING-LAMP LIGHTING-EFFECT APPLICATION, PLAYBACK METHOD, DEVICE, SYSTEM, AND STORAGE MEDIUM

CROSS-REFERENCES TO RELATED APPLICATIONS

This application claims priority to Chinese Patent Application No. CN2023113245896, filed on Oct. 13, 2023, the content of which is hereby incorporated by reference in entirety.

FIELD OF THE TECHNOLOGY

The present disclosure relates to the technical field of lighting technology and, specifically, to a splicing-lamp lighting-effect application, playback method, device, system, and computer-readable storage medium.

BACKGROUND OF THE DISCLOSURE

Splicing-lamps have the functions of displaying information and decorating atmosphere, and are widely used. Their intelligence is getting higher and higher, and their functions are constantly developing to adapt to different needs.

When the splicing-lamp needs to display or play any lighting effect, the controller needs to coordinate the lamp blocks and the light-emitting units in the lamp blocks to coordinate the lighting control of the multiple light-emitting units in the surface array to play the lighting effect. It can be seen that, in terms of hardware, the lighting control structure of the splicing-lamp is quite complex.

When defining lighting effects, not only the complexity of the light control structure of the splicing-lamps will be faced, but also the complexity of the lighting effects themselves. This can increase the difficulty for users to edit lighting effects, resulting in users often having difficulty to accurately edit the desired lighting effects when editing lighting effects in terminal devices.

The disclosed methods and apparatus are directed to solve one or more problems set forth above and other problems.

SUMMARY

Embodiments of the present disclosure provides a splicing-lamp lighting-effect application, playback method, device, system, and computer-readable storage medium.

According to one aspect of the present disclosure, a splicing-lamp lighting-effect application method is provided for a terminal device. The method includes: displaying a plane composition of a target splicing-lamp, the plane composition including form patterns corresponding to multiple lamp blocks of the target splicing-lamp, and each form pattern including multiple light-emitting areas; loading effect configuration information corresponding to each layer described in a lighting-effect template into a lighting-effect editing area for display, the effect configuration information including area information and lighting-effect information, the area information being used to specify an effective light-emitting area of a lamp block, and the lighting-effect information being used to describe a lighting-effect process acting on the effective light-emitting area; in response to a layer on-top event, determining and marking the effective light-emitting area in the form pattern of each lamp block in the plane composition according to the area information of a current layer that is set on top, obtaining a plane topological pattern corresponding to the current layer, and applying the lighting-effect information of the current layer to the plane topological pattern to display a preview lighting effect of the current layer; and responding to a lighting-effect application instruction, encapsulating edited effect configuration information of each layer in a lighting-effect application package, and pushing the lighting-effect application package to the target splicing-lamp for application.

According to another aspect of the present disclosure, a computer device is provided. The computer device includes a central processing unit and a memory. The central processing unit is used to call and run a computer program stored in the memory to perform a splicing-lamp lighting-effect application method, the method includes: displaying a plane composition of a target splicing-lamp, the plane composition including form patterns corresponding to multiple lamp blocks of the target splicing-lamp, and each form pattern including multiple light-emitting areas; loading effect configuration information corresponding to each layer described in a lighting-effect template into a lighting-effect editing area for display, the effect configuration information including area information and lighting-effect information, the area information being used to specify an effective light-emitting area of a lamp block, and the lighting-effect information being used to describe a lighting-effect process acting on the effective light-emitting area; in response to a layer on-top event, determining and marking the effective light-emitting area in the form pattern of each lamp block in the plane composition according to the area information of a current layer that is set on top, obtaining a plane topological pattern corresponding to the current layer, and applying the lighting-effect information of the current layer to the plane topological pattern to display a preview lighting effect of the current layer; and responding to a lighting-effect application instruction, encapsulating edited effect configuration information of each layer in a lighting-effect application package, and pushing the lighting-effect application package to the target splicing-lamp for application.

According to another aspect of the present disclosure, a non-transitory computer-readable storage medium is provided. The storage medium stores a computer program in the form of computer-readable instructions for, when the computer program is called and run by a computer, performing a splicing-lamp lighting-effect application method, and the method includes: displaying a plane composition of a target splicing-lamp, the plane composition including form patterns corresponding to multiple lamp blocks of the target splicing-lamp, and each form pattern including multiple light-emitting areas; loading effect configuration information corresponding to each layer described in a lighting-effect template into a lighting-effect editing area for display, the effect configuration information including area information and lighting-effect information, the area information being used to specify an effective light-emitting area of a lamp block, and the lighting-effect information being used to describe a lighting-effect process acting on the effective light-emitting area; in response to a layer on-top event, determining and marking the effective light-emitting area in the form pattern of each lamp block in the plane composition according to the area information of a current layer that is set on top, obtaining a plane topological pattern corresponding to the current layer, and applying the lighting-effect information of the current layer to the plane topological pattern to display a preview lighting effect of the current layer; and responding to a lighting-effect application instruction, encapsulating edited effect configuration information of each layer in a lighting-effect application package, and pushing the lighting-effect application package to the target splicing-lamp for application.

Compared with the prior art, the present application has many technical advantages, including but not limited to: Firstly, the present disclosure first displays the plane composition of the target splicing-lamp in the graphical user interface, and the plane composition represents the overall spatial pattern of the target splicing-lamp through the form patterns of each lamp block of the splicing-lamp, and also reflects each light-emitting area of the lamp block in the form pattern. Then, a lighting-effect editing area is provided to display the effect configuration information of each layer in the lighting-effect template, and the effective light-emitting area specified in the area information in the effect configuration information is reflected in the plane composition to show the overall spatial pattern of the target splicing-lamp. Each effective light-emitting area of each layer in each lamp block of the plane composition can be used to outline the corresponding plane topological pattern of each layer in the plane composition, so that the user can identify whether the static pattern of each layer meets the expectations. On this basis, when a layer becomes the current layer on top, the lighting-effect information in the effect configuration information of the layer is applied to the plane topological pattern of the layer to obtain the preview lighting effect of the current layer, so that the user can further identify whether the dynamic pattern of the current layer meets the expectations, and realize the comprehensive inspection of the lighting-effect preview of each layer, so that the generated lighting effect is more in line with expectations.

Secondly, by realizing the lighting-effect preview function of each layer in the graphical user interface of the terminal device, the complexity of the splicing-lamp lighting control structure and lighting effect parameters faced by the user when editing the lighting effect is reduced, which can significantly improve the efficiency of the user's accurate editing of the lighting effect and achieve the effect of what you see is what you get when editing the lighting effect.

In addition, lighting effects are essentially a kind of information, especially when the lighting effects themselves contain images or text. Therefore, it is not difficult to understand that the user may transmit the lighting-effect application package to the target splicing-lamp only after the terminal device accurately generates the lighting-effect application package. In this way, the terminal device actually verifies the validity of the lighting effect generated by the user. Therefore, the target splicing-lamp will not be arbitrarily cut off by invalid lighting effects, which can ensure the validity of the lighting effects played by the target splicing-lamp, avoid users from mis-transmitting information to the target splicing-lamp, and improve the data security of the information presented by the target splicing-lamp when playing the lighting effect.

Other aspects of the present disclosure can be understood by those skilled in the art in light of the description, the claims, and the drawings of the present disclosure. The summary is not intended to limit the scope of any embodiments described.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

FIG. 1 illustrates a schematic diagram of an electrical structure of a splicing-lamp according to an embodiment of the present disclosure;

FIG. 2 illustrates a schematic flow chart of a splicing-lamp lighting-effect application method according to an embodiment of the present disclosure;

DETAILED DESCRIPTION

Figure 3:
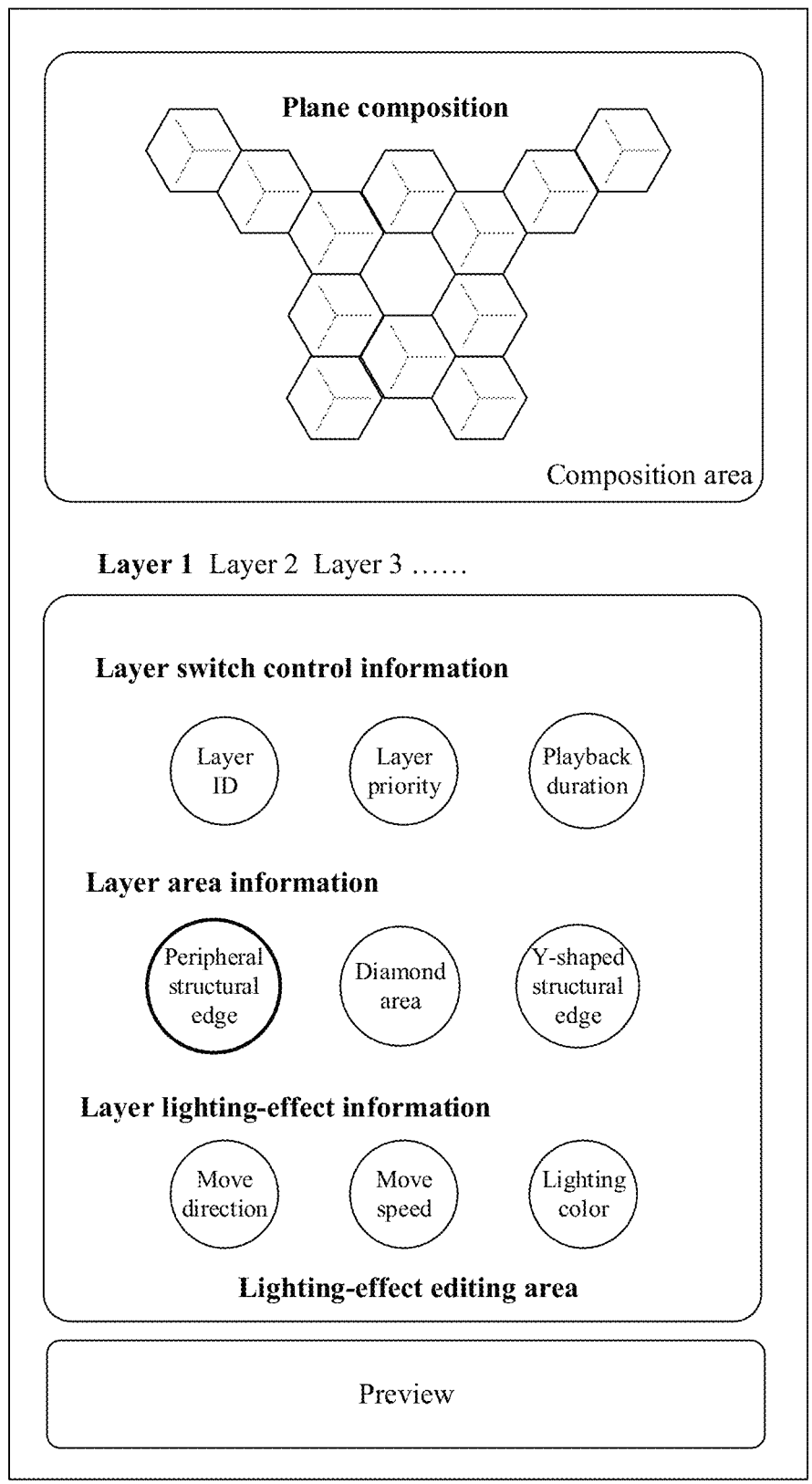
FIG. 3 illustrates a schematic diagram of a graphical user interface of a terminal device according to an embodiment of the present disclosure, which shows the composition area and the lighting effect editing area, the composition area displays the plane composition of the splicing-lamp, and the lighting effect editing area displays the editing control examples of the switching control information, area information, and lighting effect information in the effect configuration information of a current layer.

FIG. 1 illustrates a schematic diagram of an electrical structure of a splicing-lamp according to an embodiment of the present disclosure. As shown in FIG. 1, in one embodiment, a splicing-lamp may be formed by splicing multiple lamp blocks adjacent to each other to form a plane array. The entire plane array is electrically connected to a controller of the splicing-lamp. The controller centrally controls the entire plane array to play the lighting effects. Therefore, the controller is responsible for the power control of each lamp block in the entire plane array, the instruction control of each lamp block, and the data transmission of each lamp block. The product forms of lamp blocks are various. According to the characteristics of the forms of the lamp blocks and splicing relationship among the lamp blocks, a variety of different forms or shapes of lamp blocks can be used to splice the same splicing-lamp. The optional forms include any polygonal shapes, such as triangles, quadrilaterals, pentagons, hexagons, etc., or radial shapes composed of any number of lines, etc. These shapes are suitable for adjacent splicing on the same plane to form a certain layout shape. Such splicing-lamps may be used as ambient lamps, which can play the effect of decorating the space atmosphere. The lamps can also form patterns or texts to convey information through the light of the plane array. Of course, the lamps also have certain luminous functions, and are often installed in indoor spaces.

The lamp block of the present disclosure may include multiple light-emitting units, and each light-emitting unit may also be provided with a corresponding light-emitting control chip to parse the corresponding control data and generate a corresponding light-emitting control signal. The light-emitting control signal may be used to control the light-emitting components in the corresponding light-emitting unit to emit light according to specific light-emitting parameters. As a whole, the lamp block may also be provided with an independent control chip as a control unit to control the light emission of all the light-emitting units therein. This independent control unit may transmit the corresponding timing control data to the control chip of each light-emitting unit to achieve the purpose of centralized control. Of course, the entire lamp block may also be directly controlled by a single control chip to control each light-emitting unit to achieve the corresponding lighting-effect playback purpose. This may be mainly designed flexibly depending on the capabilities of the control chip used in the lamp block and its light-emitting units, and does not affect the principle and spirit of the present disclosure. Accordingly, for a lamp block, it is possible to uniformly control all its light-emitting units to emit light at the same time, or to specify the control granularity to each light-emitting unit. The finer the control granularity, the finer the light effect generated.

The multiple light-emitting units in the lamp block can be divided into areas centrally managed according to their positions on the display surface of the lamp block, so as to define multiple light-emitting areas. Generally speaking, the types of the light-emitting areas in the lamp block can be a linear structural edge and/or a planar regular surface area. For example, in one embodiment, a radial lamp block is formed by three structural edges connected at the same end to form a 'Y' shape, and the three structural edges constitute the three light-emitting areas of the lamp block. In another embodiment, a quadrilateral lamp block is equally divided into four regular surface areas to form four light-emitting areas. In another embodiment, more comprehensively, a hexagonal lamp block is divided into three rhombus regular surface areas, namely rhombus blocks or diamonds and the structural edges surrounding the three rhombus blocks, respectively, each rhombus block has three structural edges, so that from the overall perspective of the entire lamp block, the lamp block has six peripheral structural edges and three roughly Y-shaped structural edges separating the three rhombus blocks. Therefore, each rhombus block and each structural edge are separate light-emitting areas. In the various light-emitting area distribution situations in the above examples, one or more light-emitting units are arranged in each light-emitting area, and the light-emitting area and the light-emitting units arranged therein can be determined, and then each light-emitting unit can be centrally controlled as a unit of the light-emitting area.

As shown in FIG. 1, lamp blocks 1 of different lamp block forms can be spliced with each other. For example, a quadrilateral lamp block is adjacent to any structural edge of the outer periphery of a hexagonal lamp block. It is not difficult to understand that, by matching lamp blocks of different lamp block forms, a variety of array patterns can be constructed.

In order to facilitate connection with other lamp blocks 1, each lamp block 1 may be provided with corresponding connection interfaces at the structural edges presented by its geometric shape. The connection interfaces include an electrical interface, and an installation interface can also be further provided, or the installation interface and electrical interface can be combined into the same electromechanical interface. Users can assemble a splicing-lamp of the corresponding array pattern by splicing different lamp blocks 1 in sequence to form the desired topological effect. Splicing with different adjacency relationships can naturally be assembled into different array patterns. The function of the electrical interface is mainly used to transmit power, data, and instructions. The control unit that plays a central control role in the lamp block can determine whether there is a connection relationship between the structural edges by detecting the input and output status of the electrical interface corresponding to each structural edge in the lamp block, and identify the structural edge connected to other lamp blocks as a connected edge, and identify the structural edge that is not connected to other lamp blocks as an unconnected edge. For the connected edge, its connection interface is actually the output or input interface of a light-emitting unit in the structural edge. Therefore, by detecting the connection status of each light-emitting unit, it can be determined whether the lamp block is connected to other lamp blocks.

Each lamp block in the splicing-lamp can establish a communication connection with the controller by complying with the same data communication protocol. The controller is generally connected to one or more first lamp blocks, and other lamp blocks are then connected to the previously connected lamp blocks in sequence. The same lamp block can be connected to multiple other lamp blocks through its multiple structural edges to expand multiple branches. By analogy, it is not difficult to understand that the connection relationship of the entire array can constitute a tree-like connection topology. Starting from the first lamp block starting from the controller, taking the first lamp block as the root node in the tree topology, reaching each leaf end node in the tree topology can be regarded as the same branch chain. The controller can support the construction of multiple such branch chains on demand. The instructions and data issued by the controller can reach the control unit of each lamp block along the branch chain. Conversely, each lamp block can also upload its own data and instructions to the controller along the branch chain. Generally speaking, the lamp blocks in each branch chain process their own instructions and data according to the standardized data communication protocol, and at the same time, they play the role of uploading and issuing to other upper and lower lamp blocks through the branch chain. It is not difficult to understand that by identifying the connected edges and unconnected edges of each lamp block in the same branch chain to determine the connection position of the corresponding lamp block, and then combining the hierarchical order of the lamp blocks in the entire branch chain to determine the order of the lamp blocks in the entire branch chain, the surface array patterns of the entire branch chain can be identified, which corresponds to the splicing shape of the entire branch chain. By analogy, when there are multiple branch chains, the surface array patterns of multiple branch chains also constitute the entire surface array pattern of the entire splicing-lamp, corresponding to the splicing shape of the entire splicing-lamp.

For example, FIG. 1 is a splicing-lamp formed by splicing a plurality of lamp blocks 1 with regular hexagonal structures, where each lamp block 1 includes a plurality of light-emitting units, which are distributed in each rhombus block, each structural edge, and/or the structural edge between individual rhombus blocks of the regular hexagonal structure. Accordingly, each lamp block 1 can be subjected to different granularity of light control. For example, each rhombus area, each structural edge, or individual light-emitting unit therein can be controlled separately, or all light-emitting units in the lamp block 1 can be controlled as a whole.

The controller 2 in the splicing-lamp may include a control chip, and a communication component, etc., which is used to realize the operation control of the entire splicing-lamp and is responsible for the communication inside and outside the entire splicing-lamp, such as collecting the connection status information of each lamp block, transmitting the timing control data to each lamp block, and communicating with an external device about the installation, detection, lighting effect playback, and other functions. The external device communicating with the controller can be any form of terminal device with corresponding application program installed and running, such as a mobile phone, a tablet computer, a personal computer, a remote control, etc., and the installed and running application program is suitable for communicating with the controller to realize various functions.

The control chip in the controller, the control chip in the lamp-block control unit that plays a unified control role, the control chip used by each light-emitting unit in the lamp block, etc., can be implemented using various embedded chips, such as Bluetooth SoC (System on Chip) with built-in communication components, WiFi SoC, MCU (Micro Controller Unit), DSP (Digital Signal Processing) and other chips that are also configured with communication components, etc. The control chip may include a central processing unit and a memory, which is mainly used to store and execute program instructions to achieve corresponding functions. The communication component can be used to communicate with external devices wirelessly or wired. For example, the control chip in the controller can communicate with various smart terminal devices such as personal computers and smart phones, so that the user can transmit a lighting-effect application package to the splicing-lamp through the terminal device to generate timing control data corresponding to the lighting effect and transmit the timing control data to each lamp block in the splicing-lamp.

After the control chip receives the lighting-effect application package through the communication component, the lighting-effect application package can be parsed into timing control data for controlling each light-emitting unit of the splicing-lamp, and outputted to each lamp block 1 to control the corresponding light-emitting units in each lamp block 1 to play the lighting effect in coordination.

In some embodiments, the controller 2 can also be configured with a power adapter, a control panel, and/or a display screen, etc., as needed. The power adapter is mainly used to convert the main power into direct current to power the entire splicing-lamp. The control panel usually provides one or more buttons for implementing switch control of the controller 2. The display screen can be used to display various control information so as to cooperate with the buttons in the control panel to support the implementation of human-computer interaction functions. In some embodiments, the control panel and the display screen can be integrated into the same touch display screen.

Further, the splicing-lamp lighting-effect application method of the present disclosure can be implemented as a computer program product, installed in a terminal device and run by a processor. The graphical user interface of the terminal device is used to assist the user to complete the personalized customization of the lighting effect of the target splicing-lamp, and generate a corresponding lighting-effect application package to be sent to the target splicing-lamp to be applied.

FIG. 2 illustrate a flow chart of a lighting-effect application method. In one embodiment, as shown in FIG. 2, the splicing-lamp lighting-effect application method of the present disclosure includes the followings.

Step S5100, display a plane composition of a target splicing-lamp, the plane composition includes the form patterns corresponding to the multiple lamp blocks of the target splicing-lamp, and each form pattern includes multiple light-emitting areas.

As shown in FIG. 3, the plane composition of the target splicing-lamp is obtained by mapping the surface array pattern formed by the target splicing-lamp on the installation surface of the physical space to the graphical user interface of the terminal device, so the form patterns corresponding to the various lamp blocks of the target splicing-lamp may be displayed in the plane composition according to the actual shape of the physical space. The plane composition can reproduce in the graphical user interface the surface array pattern of the target splicing-lamp in the physical space, and the preview of the layer lighting-effect can be implemented based on the surface array pattern.

In one embodiment, various forms of lamp-block controls can be provided to the user for selection and addition to the composition area of the graphical user interface, so as to splice the plane composition of the target splicing-lamp. When a control of a specific form is added to the composition area, its corresponding form pattern can be displayed, and this form pattern is consistent with the front projection shape of the actual lamp block. The user can obtain the plane composition of the target splicing-lamp by adding multiple controls to the composition area in combination according to the actual array pattern of the target splicing-lamp.

In another embodiment, the terminal device can send instructions to the powered-on target splicing-lamp to control the target splicing-lamp to return the form types and connection relationship information between its various lamp blocks. The terminal device constructs the plane composition by itself according to the information of the connection relationship between the lamp blocks, and adds the plane composition to the composition area for display.

For the form pattern of each lamp block in the plane composition, the terminal device can determine the various light-emitting areas in each lamp block according to the pre-agreed information or the partitioned area information provided when the target splicing-lamp transmits back. For example, in the form pattern of the hexagonal lamp block shown in FIG. 3, the terminal device can illustrate the various structural edges and the various diamond-shaped areas in the form of a combination of light and dark lines, thereby presenting multiple light-emitting areas of the lamp block.

Step S5200, load the effect configuration information corresponding to each layer described in the lighting-effect template into the lighting-effect editing area for display, the effect configuration information includes area information and lighting-effect information, the area information is used to specify the effective light-emitting areas of the lamp block, and the lighting-effect information is used to describe the lighting-effect process applied on the effective light-emitting areas.

In order to facilitate the user to define the lighting effects of the target splicing-lamp, the lighting-effect template can be used to provide various attribute items required to define the lighting effect of each layer. The lighting effect of the target splicing-lamp may be divided into one or more layers, each layer may be assigned to certain lamp blocks, light-emitting areas, and/or light-emitting units, and each layer may have a corresponding lighting effect, and may be configured with effect configuration information. Further, in the lighting-effect editing area preset in the graphical user interface, edit controls are provided for these attribute items.

After the user specifies or enters the corresponding attribute values to the edit controls, the terminal device can form the effect configuration information with these attribute items and their attribute values, and encapsulate the effect configuration information into a lighting-effect application package.

In one embodiment, the lighting-effect template predefines the various attribute items corresponding to the lighting effect of a single layer, but does not assign values to the various attribute items, which is equivalent to defining blank effect configuration information. When the user creates a layer for the lighting effect of the target splicing-lamp, the various attribute items of the lighting-effect template are associated with the layer, and the various attribute items in the effect configuration information of the lighting-effect template are displayed in the lighting-effect editing area. Of course, the editing controls corresponding to these attribute items are also opened for the user to enter or specify the corresponding attribute values.

In another embodiment, the lighting-effect template can be a lighting-effect application package generated by historical editing. In the lighting-effect application package, corresponding effect configuration information has been set for multiple layers, and the attribute items belonging to the effect configuration information of each layer have been assigned to obtain corresponding attribute values. In this case, the corresponding layer page of each layer can be displayed in the lighting-effect editing area, as shown in FIG. 3, and the various attribute items and editing controls in the effect configuration information of the corresponding layer are associated and displayed on the layer page, and the corresponding attribute values are displayed in the editing controls.

In some embodiments, each attribute item of the effect configuration information of each layer (e.g., layer 1, which is highlighted as the currently selected layer in editing or the current layer) includes a type of area information and a type of lighting-effect information. The area information in the effect configuration information is used to specify the effective light-emitting areas in the lamp block of the target splicing-lamp. For example, in a hexagonal lamp block, the user can specify any one of the different light-emitting areas, such as a diamond area, a single structural edge, the central Y-shaped structural edge, the six peripheral structural edges, all structural edges of the entire lamp block, and all diamond areas, etc. In other words, each layer can indicate one or more effective light-emitting areas corresponding to the layer by specifying the light-emitting areas in its area information. The lighting-effect information in the effect configuration information may be used to define the lighting-effect process formed by the current layer based on its effective light-emitting areas. The setting of the attribute items of the lighting-effect information is very flexible. For example, the setting can include attribute items such as the lighting effect movement direction, lighting effect movement speed, and lighting color, etc. The actual lighting effect of the current layer is a combination of the multiple attribute items.

Step S5300, in response to a layer on-top event, determine and mark the effective light-emitting areas of the form pattern of each lamp block in the plane composition according to the area information of the current layer that is set on top, obtain the plane topological pattern corresponding to the current layer, and apply the lighting-effect information of the current layer to the plane topological pattern to display a preview lighting effect of the current layer.

When the lighting-effect template is first loaded into the lighting-effect editing area of the graphical user interface, or when the user switches layers among multiple layer pages in the lighting-effect editing area, a corresponding layer on-top event may be triggered, so that a layer becomes the current layer that is set on top, and each attribute item of the effect configuration information of the current layer is in a state that the user can touch and edit. When the user triggers the layer on-top event, the terminal device can read the area information in the effect configuration information of the current layer that is set on top, and in the plane composition, determine and mark the effective light-emitting areas corresponding to each lamp block according to the area information, so as to obtain the plane topological pattern formed by the effective light-emitting areas in the form pattern of each lamp block of the current layer in the plane composition. In some embodiments, this plane topological pattern may exist only in the memory of the terminal device, and in other embodiments, this plane topological pattern may also be highlighted or marked in other ways in the plane composition. Directly showing the plane topological pattern of the current layer in the plane composition can effectively present all effective light-emitting areas corresponding to the entire layer to the user, so that the user can view the display of the global information of the lighting status of the layer at a glance.

The lighting effect may be presented in coordination with multiple layers. Each layer has its own lighting-effect process. Each lighting-effect process is subject to the plane topological pattern of the layer to which it belongs, and to the light motion effect presented by the lighting-effect information of the layer to which it belongs. Therefore, the amount of information brought to the user by the entire lighting-effect editing process is significantly large. In this case, if the user relies on imagining the lighting effect of an individual layer when the layer is actually operational, it is obviously a daunting task for the user. Therefore, in the present disclosure, when the user triggers the layer on-top event, in response to the event, in the lighting-effect editing interface, the lighting-effect animation of the plane topological pattern of the current layer may be generated according to the various attribute items and attribute values of the lighting-effect information corresponding to the current layer, so that whenever the user switches to a layer, in the plane composition of the composition area, the user can see the preview lighting effect virtualized according to the area information and lighting-effect information of the current layer. Based on this preview lighting effect, the user can review whether the setting of each attribute item is correct, and promptly correct the attribute value that causes any mistake in the lighting effect of the current layer.

In some embodiments, the process of playing the preview lighting effect of the current layer in the plane topological pattern of the plane composition can be implemented based on a parsing scheme. Specifically, the terminal device reads the various attribute items and attribute values of the effect configuration information of the current layer, and parses them into the timing control data corresponding to the light emission of each light-emitting area through a preset algorithm. In the timing control data, the light emission timing of each light-emitting area is set according to the attribute values of various attribute items related to motion in the lighting-effect information, and the light emission color data corresponding to each light-emitting area is set according to various attribute items and attribute values related to light color in the lighting-effect information. Then, the light emission timing and light emission color data corresponding to each light-emitting area can be arranged in sequence according to the light emission timing to form timing control data. Afterwards, the timing control data is sent to an independent thread or program process to reversely parse the timing control data, and gradually control the light emission of each light-emitting area in the plane topological pattern according to the timing relationship, so as to present the lighting effect animation corresponding to the current layer. In other embodiments, of course, an animation video can also be generated according to the timing control data obtained above, and then the animation video is superimposed on the plane composition for display.

In some embodiments, a layer preview control may be further provided in the graphical user interface, as shown in FIG. 3. When the layer preview control is touched or clicked, the executing of the above process (e.g., Step S5300) may be triggered again, so that the user can trigger the corresponding layer preview event through the layer preview control at any time to preview the lighting effect of the current layer.

Step S5400, respond to a lighting-effect application instruction, encapsulate the edited effect configuration information of each layer in a lighting-effect application package, and send the lighting-effect application package to the target splicing-lamp for application.

After the user completes the editing of the lighting effect of the target splicing-lamp in the graphical user interface, the lighting-effect application instruction may be triggered through the confirmation control provided in the graphical user interface. Responding to the lighting-effect application instruction, according to the preset protocol between the terminal device and the controller of the target splicing-lamp, the terminal device may encapsulate the effect configuration information of each layer edited by the user in a preset format to obtain a lighting-effect application package. This lighting-effect application package may also be stored locally as a lighting-effect template required for the next lighting-effect editing.

Further, the terminal device sends the lighting-effect application package to the target splicing-lamp. The target splicing-lamp can parse and convert the lighting-effect application package according to preset business logic, so as to generate corresponding timing control data, and transmit the timing control data to each lamp block to control the lighting of each light-emitting unit in the corresponding light-emitting areas of each lamp block, thereby collaboratively playing the lighting effect of each layer, and collaboratively presenting the overall lighting effect through the lighting effect of each layer.

According to the above embodiments, it can be understood that the present disclosure has many technical advantages, including but not limited to: Firstly, the present disclosure first displays the plane composition of the target splicing-lamp in the graphical user interface, and the plane composition represents the overall spatial pattern of the target splicing-lamp through the form patterns of each lamp block of the splicing-lamp, and also reflects each light-emitting area of the lamp block in the form pattern. Then, a lighting-effect editing area is provided to display the effect configuration information of each layer in the lighting-effect template, and the effective light-emitting area specified in the area information in the effect configuration information is reflected in the plane composition to show the overall spatial pattern of the target splicing-lamp. Each effective light-emitting area of each layer in each lamp block of the plane composition can be used to outline the corresponding plane topological pattern of each layer in the plane composition, so that the user can identify whether the static pattern of each layer meets the expectations. On this basis, when a layer becomes the current layer on top, the lighting-effect information in the effect configuration information of the layer is applied to the plane topological pattern of the layer to obtain the preview lighting effect of the current layer, so that the user can further identify whether the dynamic pattern of the current layer meets the expectations, and realize the comprehensive inspection of the lighting-effect preview of each layer, so that the generated lighting effect is more in line with expectations.

Secondly, by realizing the lighting-effect preview function of each layer in the graphical user interface of the terminal device, the complexity of the splicing-lamp lighting control structure and lighting effect parameters faced by the user when editing the lighting effect is reduced, which can significantly improve the efficiency of the user's accurate editing of the lighting effect and achieve the effect of what you see is what you get when editing the lighting effect.

In addition, lighting effects are essentially a kind of information, especially when the lighting effects themselves contain images or text. Therefore, it is not difficult to understand that the user will transmit the lighting-effect application package to the target splicing-lamp only after the terminal device accurately generates the lighting-effect application package. In this way, the terminal device actually verifies the validity of the lighting effect generated by the user.

Therefore, the target splicing-lamp will not be arbitrarily cut off by invalid lighting effects, which can ensure the validity of the lighting effects played by the target splicing-lamp, avoid users from mis-transmitting information to the target splicing-lamp, and improve the data security of the information presented by the target splicing-lamp when playing the lighting effect.

Figure 4:
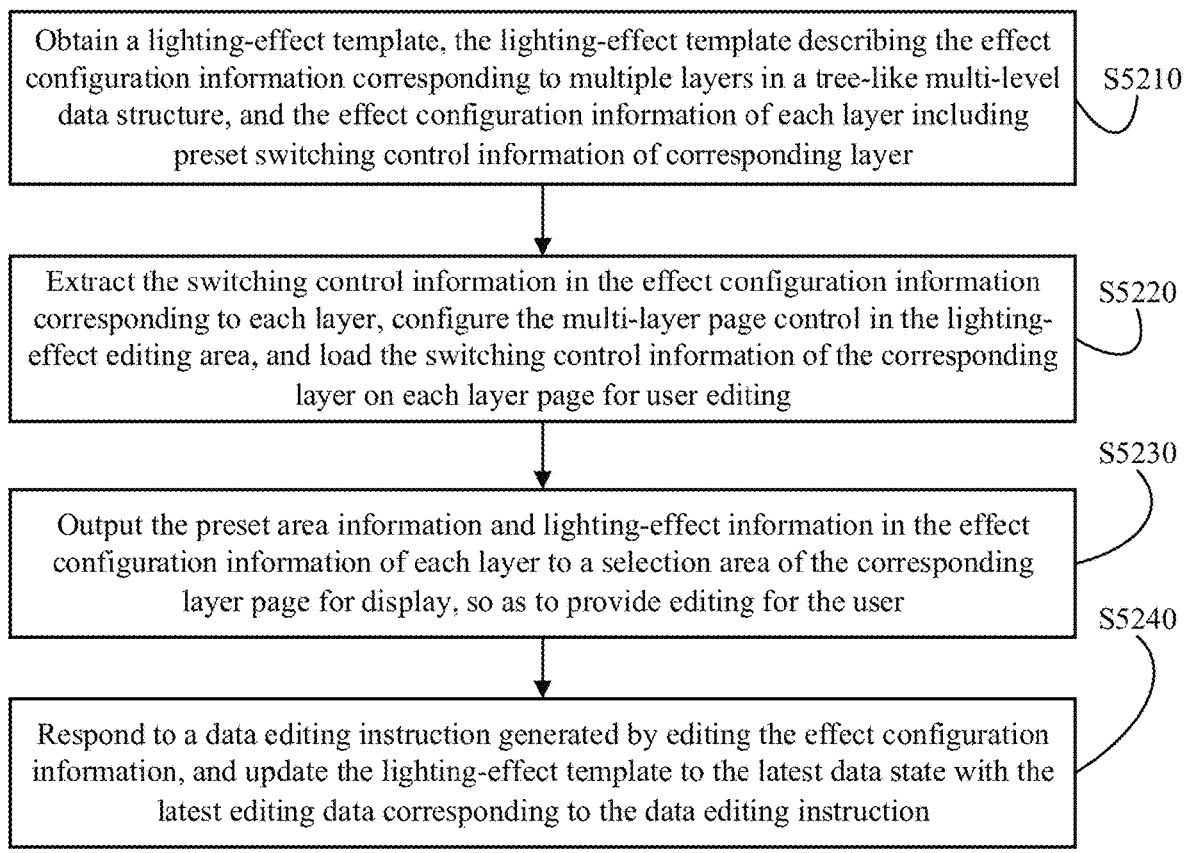
FIG. 4 illustrates a schematic flow chart of customizing lighting effect and editing a lighting effect template by a user according to an embodiment of the present disclosure.

Based on above embodiments of the present disclosure, FIG. 4 illustrates a schematic flow chart of customizing lighting effect and editing a lighting effect template by a user, where the terminal device loads the effect configuration information corresponding to each layer described in the lighting-effect template into the lighting-effect editing area for display. As shown in FIG. 4, this process may include the followings.

Step S5210, obtain a lighting-effect template, the lighting-effect template describes the effect configuration information corresponding to multiple layers in a tree-like multi-level data structure, and the effect configuration information of each layer includes preset switching control information of corresponding layers.

The lighting-effect template of the present disclosure can use the format of representation of computer program objects, and the effect configuration information of all layers of the lighting effect can be described as a class, so as to achieve the description of the effect configuration information corresponding to each layer in a tree-like multi-level data structure of the class. Processing the lighting-effect template in this way can be combined with computer programming to reflect the advantages of the data structure, and facilitate the efficient generation and calling of various attribute items and their attribute values in the class during programming. Similarly, when the lighting-effect application package is generated after the lighting-effect template is edited, the advantage of this rapid organization can also be reflected.

There is also an avoidance relationship between the various layers of the lighting effect, such as whether there are synchronous overlapping time zones or sequential relationships between the playback timing of multiple layers, the relative playback duration and relative playback speed between the various layers, etc. This avoidance relationship can be defined by rationally designing the corresponding attribute items and attribute values of each layer. In some embodiments, the attribute items and attribute values related to the avoidance relationship between the layers are included in the effect configuration information of the layer as the switching control information of the layer to meet the structural characteristics of class encapsulation.

In one embodiment, the switching control information of each layer may include attribute items corresponding to the layer priority and the layer playback duration. The following is an example of the switching control information of three layers in the same lighting effect:

Layer 1: Layer ID=Layer 1; Layer priority=1; Layer playback duration=300 ms;

Layer 2: Layer ID=Layer 2; Layer priority=1; Layer playback duration=400 ms;

Layer 3: Layer ID=Layer 3; Layer priority=2; Layer playback duration=600 ms.

From the above example, it can be seen that layer 1 and layer 2 have the same layer priority, which means that layer 1 and layer 2 are played at the same time, but their playing durations are different. Layer 1 ends after playing for 300 ms, and layer 2 continues to play until 400 ms before ending. Then layer 3 is further played for 600 ms before entering the next loop playback cycle.

It can be seen that the layer switching control information can flexibly use various attribute items to define the switching relationship between different layers, and encapsulate the switching control information as the lower-level parameters of the effect configuration information of the corresponding layer, which is more clearly classified. After the effect configuration information is loaded into the lighting-effect editing area, the user's lighting-effect editing efficiency can be improved.

Step S5220, extract the switching control information in the effect configuration information corresponding to each layer, configure the multi-layer page control in the lighting-effect editing area, and load the switching control information of the corresponding layer on each layer page for user editing.

In the graphical user interface, for different layers corresponding to the lighting effect, a multi-layer page control can be used to present the lighting-effect editing area corresponding to each layer. Since the switching control information of each layer is included in the class structure, it is necessary to read the switching control information in the effect configuration information of each layer from the class structure corresponding to each layer, identify each layer through the switching control information of each layer, and then create a corresponding layer page in the multi-layer page control, and provide the switching control information corresponding to each layer including its attribute items and corresponding attribute values to the user for editing.

Step S5230, output the preset area information and lighting-effect information in the effect configuration information of each layer to a selection area of the corresponding layer page for display, so as to provide editing for the user.

Similarly, for the area information and lighting-effect information in the effect configuration information of each layer, their specific attribute items and attribute values can also be loaded and outputted to the selection area of the layer page of the layer for display, so as to facilitate user editing.

In some embodiments, some attribute items may provide edit controls for users to enter property values, while some attribute items may provide edit controls for users to select one or more property values, which can be flexibly set depending on the data attributes of the specific attribute items.

Step S5240, respond to a data editing instruction generated by editing the effect configuration information, and update the lighting-effect template to the latest data state with the latest editing data corresponding to the data editing instruction.

When the user edits and sets the attribute value for an attribute item in any layer page, the corresponding data editing instruction can be triggered immediately, or the data editing instruction is triggered only when the user triggers the save control provided in the graphical user interface. In response to the data editing instruction, the latest editing data edited by the user in the effect configuration information of each layer is obtained, and the lighting-effect template is re-assigned to each attribute item in the memory with the latest editing data, so as to update the lighting-effect template and update the attribute values of individual attribute items in its class structure to the latest data state.

According to the above embodiments, the various complex attribute items of lighting effects are sorted out in a tree-like multi-level data structure, which not only can realize the efficient organization of lighting effect data, but also conveniently and efficiently present the interface to improve the editing efficiency of users. In addition, by integrating the switching control information of the layer into the effect configuration information of the corresponding layer, it is convenient to centrally define the layer, so that the effect configuration information of the layer can be centrally edited. When combined with the purpose of previewing the lighting effect, it can assist users to quickly and accurately customize the lighting effects of each layer.

Based on the above embodiment of the present disclosure, before responding to the lighting-effect application instruction, the process may include the followings.

Step S4100, obtain the latest editing data of the switching control information in the effect configuration information of each layer set by the user, where the switching control information of multiple specific layers limits the synchronous application of the multiple specific layers, and the multiple specific layers are limited to different plane topological patterns.

In one embodiment, a listening thread or process can be implemented in the terminal device to handle the synchronous preview relationship between multiple layers with overlapping playback durations. This listening thread is first responsible for timely obtaining the latest editing data of the switching control information in the effect configuration information of each layer. Usually, when the user edits the attribute value of any attribute item in any switching control information, the attribute value of the corresponding attribute item can be obtained immediately to maintain the immediacy of the data. The listening thread then determines whether there are layers that are synchronously applied between the layers based on the latest switching control information. For example, in the three layers in the previous example, layer 1 and layer 2 are layers of the same priority, indicating that the two layers are played synchronously, and according to the playing time of the two layers, it can be determined that layer 1 and layer 2 are synchronously applied in the first 300 ms. Considering that if the plane topological patterns of the two layers are completely identical, this synchronous application may lose its meaning, the listening thread further determines the subsequent processing by comparing whether the plane topological patterns of multiple synchronously applied layers, such as layer 1 and layer 2, are identical.

In one example, when two plane topological patterns do not overlap at all, for example, the plane topological pattern of layer 1 specifies the outer contour structure edge of all hexagonal lamp blocks in the plane composition, and the plane topological pattern of layer 2 specifies the diamond area of all hexagonal lamp blocks in the plane composition, in this case, the subsequent processing is continued.

In other examples, when the plane topological patterns of the three layers do not overlap at all, and each layer corresponds to a diamond area in one direction of the specified hexagonal lamp block, the subsequent processing is continued.

According to the above examples, similarity detection of plane topological patterns between different layers with synchronous application relationships can be used to guide users to generate lighting effects with certain special effects. For example, when the three diamond areas of the hexagonal lamp block belong to different layers respectively, and the three layers are synchronously applied, the differences in the color data specified in the lighting-effect information of the three layers can be used to control the three layers to collaboratively present the three-dimensional effect of each lamp block.

Step S4200, monitor whether any one of the multiple specific layers is switched as the current layer. If it is the current layer, according to the latest edited data of the area information and lighting-effect information of the multiple specific layers, the preview lighting effects of the multiple specific layers are synchronously applied in the plane topological pattern corresponding to the multiple specific layers in the plane composition.

The monitoring thread is also responsible for monitoring the layer on-top event. When the layer on-top event is triggered, it can be further determined whether the current layer is any one of the multiple layers with a synchronous application relationship. If not, the current layer can be presented with a preview lighting effect separately according to step S5300. If yes, it indicates that the preview lighting effects of the multiple layers with a synchronous application relationship with the current layer need to be synchronously presented. Accordingly, the latest edited data of the area information and lighting-effect information of each layer with a synchronous application relationship are read out, and the preview lighting effects of each layer can be presented in the plane composition.

It can be seen from the above embodiments that, when the user configures multiple specific layers as a synchronous application relationship, the terminal device can automatically present the preview lighting effects of multiple specific layers together. For the scene where the user uses different layers to present the superposition effect, the WYSIWYG (what you see is what you get) function can be enhanced, so that the user can quickly identify the preview effect after the superposition of the lighting effects of different layers, and adjust the lighting effects in time as needed. In particular, the above embodiments can be used to assist users in creating lighting effects with three-dimensional effects by setting the effect configuration information of multiple layers.

On the basis of the above embodiments of the present disclosure, the process where the effect configuration information of each layer after editing is encapsulated in a lighting-effect application package may include the followings.

Step S5410, obtain the latest editing data of the effect configuration information of each layer from the lighting-effect editing area.

When the user completes the editing of the lighting effect and needs to encapsulate the lighting-effect application package, a lighting-effect application instruction can be issued to the terminal device, prompting the terminal device to read the attribute values of the attribute items of the effect configuration information of each layer from the lighting-effect editing area, that is, the latest editing data set by the user for each attribute item. These latest editing data include both the attribute items and their attribute values modified by the user and the attribute items and their attribute values that are not modified by the user and maintained in the default state. In short, the latest data of all effect configuration information belonging to the current lighting effect is obtained.

Step S5420, format the latest editing data into a lighting-effect application package in a tree-like multi-level data structure, wherein the switching control information of each layer is used as the secondary parameters of the effect configuration information.

In order to reflect the data organization advantage of the lighting-effect application package, as mentioned above, all the latest edited data corresponding to all the effect configuration information of the current lighting effect can be encapsulated into a lighting-effect application package according to the class encapsulation format, and all the effect configuration information can be efficiently organized through the tree-like multi-level structure of the class format.

In one embodiment, the effect configuration information of each layer can be encapsulated into a single class. In another embodiment, the effect configuration information of all layers can also be encapsulated in the same class. The specific setting can be flexibly set as long as the controller of the terminal device and the target splicing-lamp can parse the lighting-effect application package encapsulated in this data format to obtain the various effect configuration information therein.

Thus, it can be known that, in the lighting-effect application package, the switching control information of each layer may be encapsulated as the secondary parameters of the effect configuration information of each layer, so that various description information related to each layer can be centrally organized, which can improve data access efficiency.

Accordingly, it can be seen that the lighting-effect application package is encapsulated in an efficient data format, and the switching control information representing the avoidance relationship between layers is also classified into the effect configuration information of each layer, so as to achieve efficient organization of various attribute data of the lighting effect. It not only can improve data access efficiency but also minimize the data volume. When the lighting-effect application package is pushed to the controller of the target splicing-lamp, the transmission volume is small, which has efficiency advantages for the controller using embedded chips.

Based on the above embodiments of the present disclosure, after the effect configuration information corresponding to each layer described in the lighting-effect template is loaded into the lighting-effect editing area for display, the process may also include the followings.

Step S6100, respond to the lighting-effect preview instruction, generate an execution script applicable on the plane composition according to the latest editing data of the effect configuration information of each layer in the lighting-effect editing area.

In one embodiment, a lighting-effect preview control can also be provided in the graphical user interface. When the user touches the lighting-effect preview control, the corresponding lighting-effect preview instruction is triggered. In response to the lighting-effect preview instruction, the terminal device can create an execution script for playing the preview effect of the entire lighting effect.

The process of creating the execution script can be implemented by referring to the process of creating the timing control data of the preview lighting effect of the layer in the previous description. Specifically, the terminal device reads the various attribute items and attribute values of the effect configuration information of each layer. The data belongs to the latest edited data corresponding to the user's editing, including attribute items with attribute values that have not been modified by the user and attribute items with attribute values that have been modified by the user. Then, through a preset algorithm, the data is parsed into the timing control data corresponding to the lighting of each light-emitting area. In the timing control data, the lighting timing of each light-emitting area is set according to the attribute values of various attribute items related to motion in the lighting-effect information, and the lighting color data corresponding to each light-emitting area is set according to various attribute items and attribute values related to the lighting color in the lighting-effect information. Then, the lighting timing and lighting color data corresponding to each light-emitting area are used as units to generate corresponding script statements, and these script statements are arranged in sequence according to the lighting timing to obtain the entire execution script. Each script statement in the execution script can control a corresponding light-emitting area or lighting-emitting unit in the plane composition to be displayed in a specific color at a specific timing.

In the process of constructing the execution script, the processing of the timing relationship between multiple layers can include: according to the various attribute items and attribute values in the switching control information of each layer, the timing corresponding to the corresponding light-emitting areas in each layer can be determined to define the corresponding script statement; then, based on all layers, the timing of the script statements corresponding to the layers are reordered, so that the timing of all script statements in the execution script can be unified to the same time dimension, so that the script statements are arranged in a time sequence, so as to ensure that each script statement accurately reflects the lighting effect after execution.

Step S6200, run the execution script, and play the preview lighting effect of each layer in the plane composition according to the latest edited data of the effect configuration information of each layer, where the switching order of each layer is controlled by the switching control information of each layer.

After obtaining the execution script of the current lighting effect, the execution script can be reversely parsed, and the script statements therein can be executed one by one in sequence. According to the script statements, the corresponding color of the corresponding lighting effect is displayed in the corresponding light-emitting area in the plane composition to illustrate the lighting effect of the corresponding light-emitting area in the target splicing-lamp. Through the sequential execution of each script statement, not only the preview lighting effect of each layer can be presented, but also the lighting effect animation under the coordinated effect of all layers of the entire lighting effect can be presented.

Since each script statement in the execution script is determined by the timing reordered according to the switching control information of the corresponding layer, in the lighting effect animation presented by the entire lighting-effect preview, the effect of each layer switching accurately according to the constraints of its corresponding switching control information can be seen.

According to the above embodiments, it can be seen that in the graphical user interface of the terminal device, the present disclosure not only realizes the preview of lighting effects at the layer level, but also realizes the global preview of lighting effects between multiple layers, which provides a comprehensive solution for guiding users to accurately edit lighting effects, and can improve the efficiency and accuracy of lighting effect editing by users.

Figure 5:
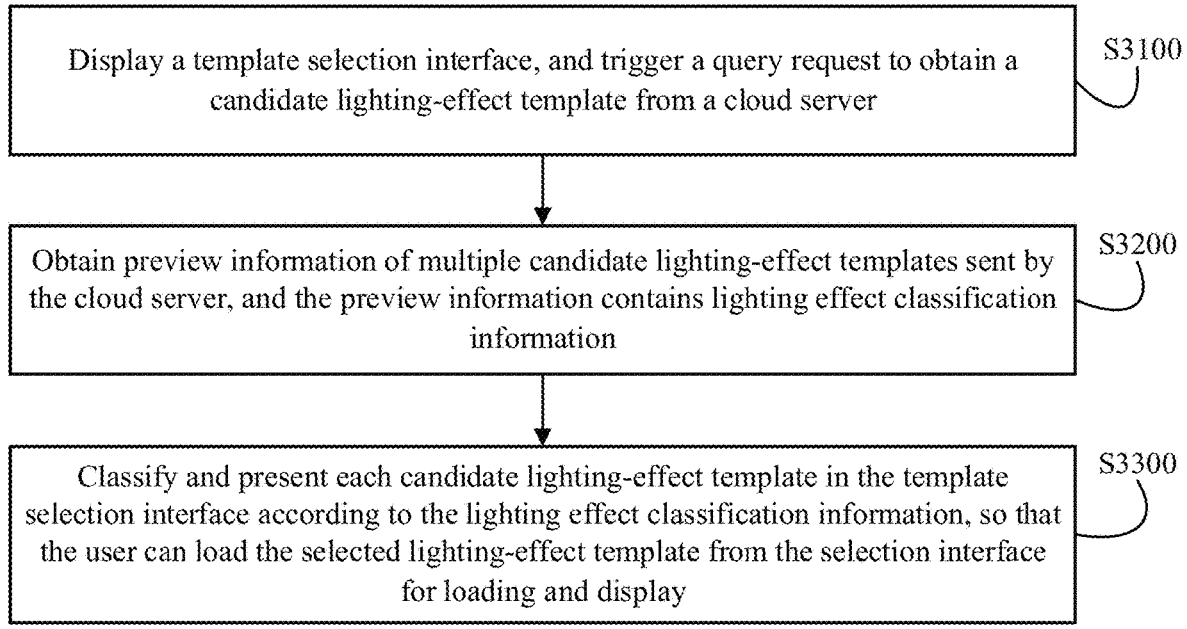
FIG. 5 illustrates a schematic flow chart selecting the lighting effect template for editing by a user according to an embodiment of the present disclosure.

Based on the above embodiments of the present disclosure, referring to FIG. 5, before the effect configuration information corresponding to each layer described in the lighting-effect template is loaded into the lighting-effect editing area for display, the process may also include the followings.

Step S3100, display a template selection interface, and trigger a query request to obtain a candidate lighting-effect template from a cloud server.

In some embodiments, the user can publish the lighting-effect application package generated by own editing to the cloud server as a lighting-effect template backup, or share it with other users for being called. Correspondingly, the user can also call the lighting-effect template provided by own or by others from the cloud server to facilitate in obtaining a personalized lighting-effect application package by modifying the existing or called lighting-effect template.

When the user needs to edit the lighting effect of the target splicing-lamp, the template selection interface can be opened in the terminal device, thereby triggering a query request to obtain the candidate lighting-effect template from the cloud server and sending the request to the cloud server.

Step S3200, obtain preview information of multiple candidate lighting-effect templates sent by the cloud server, and the preview information contains lighting effect classification information.

After the cloud server receives the query request sent by the user side, the cloud server can use the multiple lighting-effect application packages stored in advance as lighting-effect templates to generate preview information of these lighting-effect templates. For example, the lighting effect video of the lighting-effect template can be used as preview information, or the effect description text of the lighting-effect template can be used as preview information, etc. Moreover, the cloud server can also add the corresponding lighting effect classification information in the preview information of the lighting-effect template. The lighting effect classification information can be classified according to the scene type of the lighting effect, such as snowflake scene, rainy day scene, etc., or it can be classified according to the motion mode, such as radiation diffusion, horizontal movement, etc. Through the lighting effect classification information, the query and retrieval efficiency can be improved. After the cloud server queries multiple candidate lighting-effect templates for the user according to the preset business logic, the cloud server encapsulates the preview information of these candidate lighting-effect templates into a list and sends the list to the terminal device on the user side. The terminal device then obtains the preview information of each candidate lighting-effect template in this list accordingly.

Step S3300: classify and present each candidate lighting-effect template in the template selection interface according to the lighting effect classification information, so that the user can load the selected lighting-effect template from the selection interface for loading and display.

The terminal device classifies, loads, and displays each candidate lighting-effect template in the template selection interface according to the lighting effect classification information carried in the preview information of each candidate lighting-effect template, so that the user can browse each candidate lighting-effect template according to the classification. When loading and displaying the candidate lighting-effect template, the terminal device can display various specific information carried in the preview information, such as lighting effect video, description text, etc., in the template selection interface, so that the user can intuitively understand the lighting effect characteristics of the candidate lighting-effect template. When the user selects a candidate lighting-effect template as the target lighting effect, step S5100 and subsequent steps of the present disclosure can be triggered.

According to the above embodiments, the present disclosure can provide users with a more convenient lighting effect generation solution and provide users with optional candidate lighting-effect templates, so that users can customize personalized lighting effects based on the selected lighting-effect templates. In addition, since the lighting-effect templates and the lighting-effect application packages are data encapsulated in the same data structure, the data volume is small and the transmission is fast during network storage and transmission, which helps to save system overhead in the background of providing lighting-effect templates.

Figure 6:
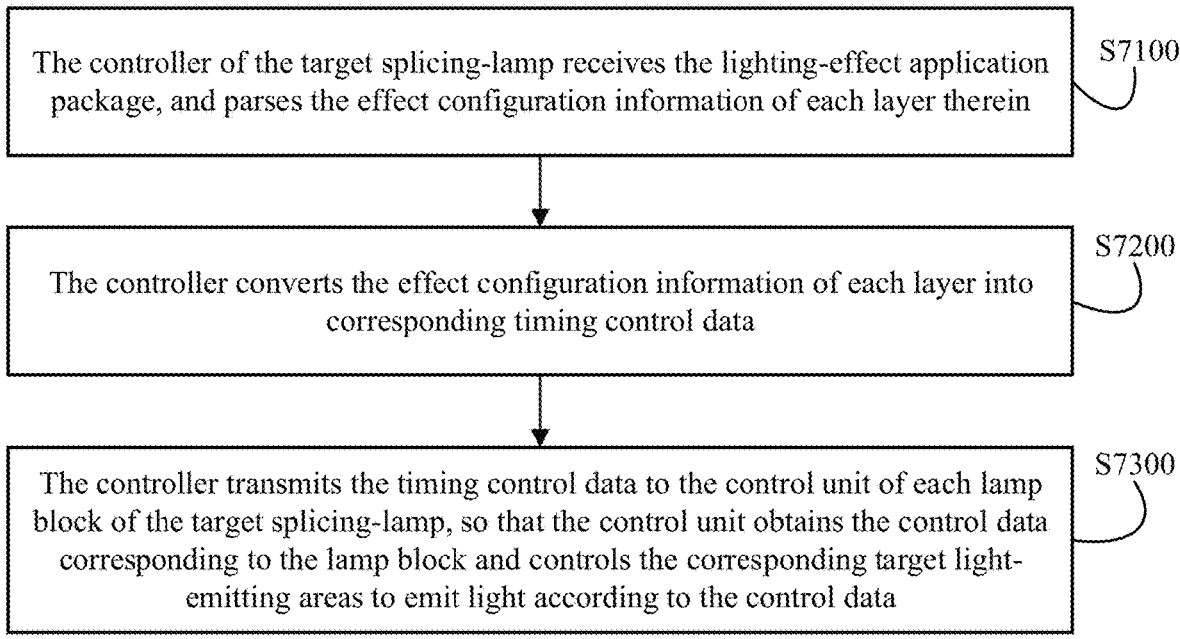
FIG. 6 illustrates a schematic flow chart of lighting effect playback method of the splicing-lamp according to an embodiment of the present disclosure.

According to another aspect of the present disclosure, a process for playing lighting effects of splicing-lamps is provided. As shown in FIG. 6, the process may include the followings.

Step S7100, the controller of the target splicing-lamp receives the lighting-effect application package, and parses the effect configuration information of each layer therein.

The lighting-effect application package received by the controller of the splicing-lamp is generated and pushed to the controller according to the lighting-effect application method of the splicing-lamp of the present disclosure and, thus, it can be a lighting-effect application package generated by the previously described lighting-effect application method of the splicing-lamp of the present disclosure.

When the lighting-effect application package of the present disclosure is transmitted to the target splicing-lamp, the controller of the target splicing-lamp can quickly receive the lighting-effect application package, and then parse the lighting-effect application package according to the preset protocol to obtain the effect configuration information of each layer.

Step S7200, the controller converts the effect configuration information of each layer into corresponding timing control data.

The controller further converts the effect configuration information of each layer into timing control data for controlling the corresponding light-emitting units in the corresponding light-emitting areas of each lamp block according to the preset control data conversion logic. The conversion logic of these timing control data can refer to the processes used to generate layer preview lighting effects in the previous embodiments of the present disclosure for conversion, which is determined by the business logic implemented by the controller itself, and is not limited here.

Step S7300, the controller transmits the timing control data to the control unit of each lamp block of the target splicing-lamp, so that the control unit obtains the control data corresponding to the lamp block and controls the corresponding target light-emitting areas to emit light according to the control data.

After the controller generates the timing control data, it can transmit the timing control data to the control unit of each lamp block. The control unit of each lamp block obtains the control data of each light unit corresponding to each light-emitting area from the timing control data according to its default business logic, and then sends this control data to the control chip of each light unit of the lamp block. The control chip of each light unit also reads the local control data corresponding to itself from the control data, and then converts this local control data into a light control signal to drive its own light-emitting element to work and emit light. Although each lamp block of the target splicing-lamp uses light-emitting unit as a unit for lighting control, when customizing the lighting effect, it is set for the light-emitting areas in the lamp block, and the controller already knows the light-emitting units corresponding to each light-emitting area in each lamp block in advance, so the controller can accurately convert the designation of the light-emitting area in the lighting-effect application package into the designation of each light-emitting unit in the light-emitting area, thereby realizing accurate control of the corresponding light-emitting area.

Through the controller's conversion of the lighting-effect application package and the control of each lamp block, the user-customized lighting effect can be accurately applied to each light-emitting area of each lamp block. Thus, through the coordinated lighting of multiple layers corresponding to each light-emitting area, the entire user-customized lighting effect can be comprehensively presented, and the user-customized lighting effect can be accurately applied to the target splicing-lamp.

According to the above embodiments, it can be known that the lighting-effect application package generated by the user after editing and preview verification can be directly applied to the target splicing-lamp without the need for the target splicing-lamp to participate in the verification procedure. With the assistance of the preview function, the target splicing-lamp only needs to be responsible for parsing the lighting-effect application package and playing the corresponding lighting effect. There is no need to worry about playing the wrong lighting effect and displaying unexpected information, and the data security is improved.

Figure 7:
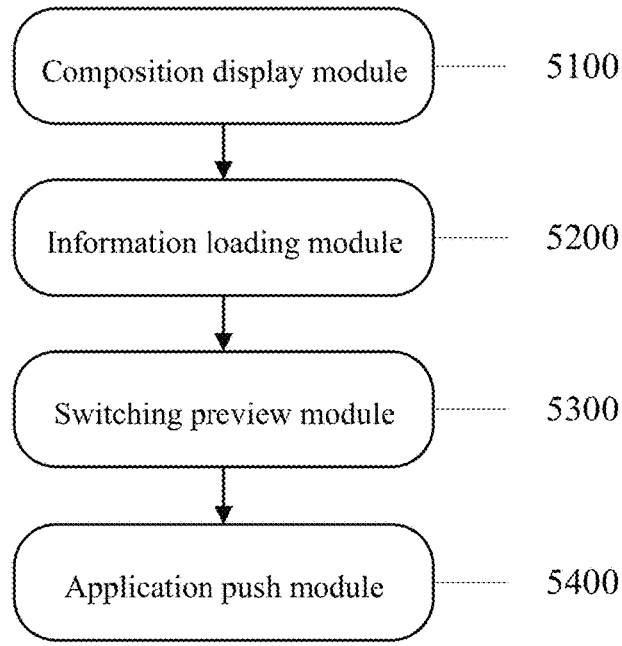
FIG. 7 illustrates a schematic structural diagram of a computer device according to an embodiment of the present disclosure.

Referring to FIG. 7, another embodiment of the present disclosure further provides a lighting-effect application device for splicing-lamps. As shown in FIG. 7, the lighting-effect application device may include a composition display module 5100, an information loading module 5200, a switching preview module 5300, and an application push module 5400, etc.

The composition display module 5100 may be configured to display a plane composition of a target splicing-lamp, where the plane composition includes form patterns corresponding to a plurality of lamp blocks of the target splicing-lamp, and each form pattern includes a plurality of light-emitting areas. The information loading module 5200 may be configured to load the effect configuration information corresponding to each layer described in the lighting-effect template into the lighting-effect editing area for display, where the effect configuration information includes area information and lighting-effect information, and the area information can be used to specify the effective light-emitting areas of the lamp block, and the lighting-effect information is used to describe the lighting-effect process acting or applicable on the effective light-emitting areas. The switching preview module 5300 may be configured to respond to the layer on-top event, determine and mark the effective light-emitting areas of the form pattern of each lamp block in the plane composition according to the area information of the current layer that is set on top, obtain the plane topological pattern corresponding to the current layer, and apply the lighting-effect information of the current layer to the plane topological pattern to display the preview lighting effect of the current layer. The application push module 5400 may be configured to respond to the lighting-effect application instruction, encapsulate the edited effect configuration information of each layer in the lighting-effect application package, and push the lighting-effect application package to the target splicing-lamp for application. Based on the above embodiments of the present disclosure, the information loading module 5200 may include: a template acquisition unit, configured to acquire the lighting-effect template, the lighting-effect template describes the effect configuration information corresponding to multiple layers in a tree-like multi-level data structure, and the switching control information of the corresponding layer is preset in the effect configuration information of each layer; a control configuration unit, configured to extract the switching control information in the effect configuration information corresponding to each layer, configure the multi-layer page control in the lighting-effect editing area, and load the switching control information of the corresponding layer on each layer page for user editing; an information output unit, configured to output the preset area information and lighting-effect information in the effect configuration information of each layer to the selection area of the corresponding layer page for display, so as to be edited by the user; a data update unit, configured to respond to the data editing instruction generated by the editing of the effect configuration information, and update the lighting-effect template to the latest data state with the latest editing data corresponding to the data editing instruction.

Based on the above embodiments of the present disclosure, the splicing-lamp lighting-effect application device of the present disclosure includes: a switching information acquisition module, which is configured to obtain the latest editing data of the switching control information in the effect configuration information of each layer set by the user, where the switching control information of multiple specific layers limits the synchronous application of the multiple specific layers, and the multiple specific layers limit different plane topological patterns; a layer monitoring processing module, which is configured to monitor whether any one of the multiple specific layers is switched to the current layer, and if it is the current layer, according to the area information of the multiple specific layers and the latest editing data of the lighting-effect information, the preview lighting effects of the multiple specific layers are synchronously applied in the plane topological patterns corresponding to the multiple specific layers in the plane composition.

Based on the above embodiments of the present disclosure, the application push module 5400 includes: a data reading unit, which is configured to obtain the latest editing data of the effect configuration information of each layer from the lighting-effect editing area; a format conversion unit, which is configured to format the latest editing data into a lighting-effect application package in a tree-like multi-level data structure, wherein the switching control information of each layer is used as the secondary parameter of its effect configuration information.

Based on the above embodiments of the present disclosure, the splicing lamp lighting-effect application device of the present disclosure also includes: a lighting-effect preview module, which responds to the lighting-effect preview instruction and generates an execution script acting on the plane composition according to the latest editing data of the effect configuration information of each layer in the lighting-effect editing area; an animation playback module, which runs the execution script and plays the preview lighting effects of each layer in the plane composition according to the latest editing data of the effect configuration information of each layer, wherein the switching order of each layer is controlled by the switching control information of each layer.

Based on the above embodiments of the present disclosure, the splicing lamp lighting-effect application device of the present disclosure also includes: a request trigger module, which is configured to display the template selection interface and trigger a query request to obtain a candidate lighting-effect template from the cloud server; a preview download module, which is configured to obtain preview information of multiple candidate lighting-effect templates pushed by the cloud server, wherein the preview information includes lighting effect classification information; a classification display module, which is configured to present each candidate lighting-effect template in the template selection interface according to the lighting effect classification information, so that the user can load the selected lighting-effect template from the selection interface for loading and display.

Another embodiment of the present disclosure also provides a splicing-lamp lighting effect playback device, which may include: a lamp parsing module, configured to receive a lighting-effect application package by a controller of a target splicing-lamp, parse out the effect configuration information of each layer therein, and the lighting-effect application package is pushed to the controller by the splicing-lamp lighting-effect application device of the present disclosure; a lamp conversion module, configured to convert the effect configuration information of each layer into corresponding timing control data by the controller; a lamp application module, configured to transmit the timing control data to the control unit of each lamp block of the target splicing-lamp by the controller, so that the control unit obtains the control data corresponding to the lamp block, and controls the corresponding target light-emitting area to emit light according to the control data.

Figure 8:
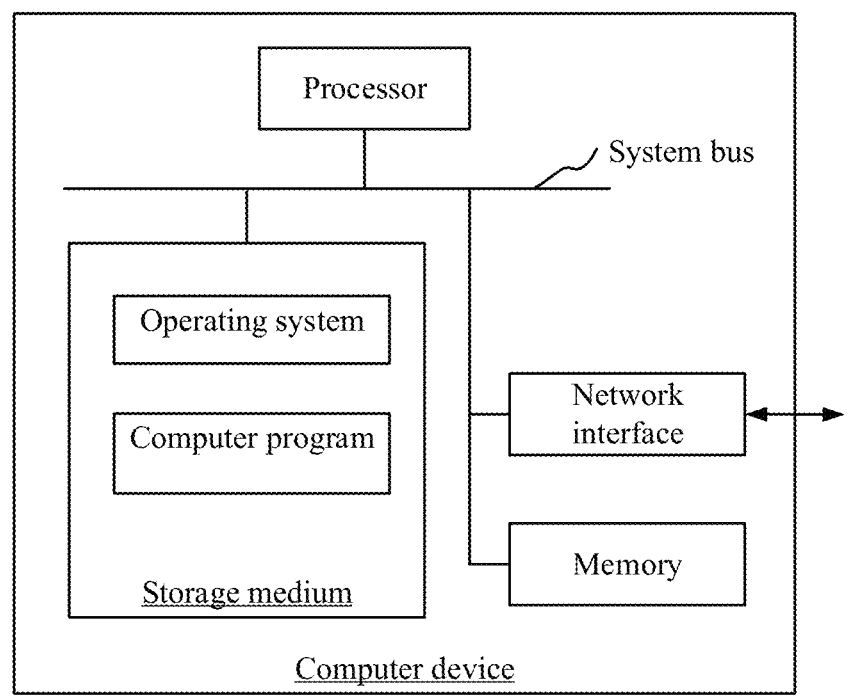
FIG. 8 illustrates a schematic structural diagram of another computer device according to an embodiment of the present disclosure.

Another embodiment of the present disclosure also provides a computer device. FIG. 8 illustrates a schematic diagram of the internal structure of the computer device. The computer device may be configured to implement the above mentioned devices, modules, units, terminal devices, and/or servers. As shown in FIG. 8, the computer device includes a processor, a computer-readable storage medium, a memory, and a network interface, etc., all connected through a system bus. Among them, the computer-readable storage medium of the computer device may store an operating system, a database and computer-readable instructions, and the database may store a control information sequence. When the computer-readable instructions are executed by the processor, the processor can implement a splicing lamp lighting-effect application method or a splicing lamp lighting effect playback method. The processor of the computer device is used to provide computing and control capabilities to support the operation of the entire computer device. The memory of the computer device may store computer-readable instructions, and when the computer-readable instructions are executed by the processor, the processor can execute the splicing lamp lighting-effect application method or the splicing lamp lighting effect playback method of the present disclosure. The network interface of the computer device is used to connect and communicate with other devices. It can be understood by those skilled in the art that the structure shown in FIG. 8 is only a block diagram of a partial structure related to the present disclosure, and does not constitute limitation on the computer device to which embodiments of the present disclosure can be applied. The specific computer device may include more or fewer components than shown, or may combine certain components, or may have different component arrangements.

In one embodiment, the processor is used to execute the specific functions of each module and its submodules or units shown in FIG. 7, and the memory stores the program code and various types of data required to execute the above modules or submodules. The network interface is used to transmit data between the terminal device and the server. The memory in one embodiment stores the program code and data required to execute all modules/submodules in the splicing lamp lighting-effect application device of the present disclosure, and the server can call the program code and data of the server to execute the functions of all submodules.

The present disclosure also provides a storage medium storing computer-readable instructions. The computer-readable instructions can be executed by one or more processors, so as to implement the steps of the splicing lamp lighting-effect application method or the splicing lamp lighting effect playback method described in any embodiment of the present disclosure.

The present disclosure also provides a computer program product, including a computer program/instructions. When the computer program/instructions are executed by one or more processors, the steps of the splicing lamp lighting-effect application method or the splicing lamp lighting effect playback method described in any embodiment of the present disclosure are implemented.

A person skilled in the art can understand that the implementation of all or part of the processes in the above-mentioned embodiments of the present disclosure can be completed by instructing the relevant hardware through a computer program. The computer program can be stored in a computer-readable storage medium. When the program is executed, it can include the processes of above embodiments of the present disclosure. Among them, the aforementioned storage medium may be a non-transitory computer-readable storage medium such as a magnetic disk, an optical disk, a read-only memory (ROM), or a random access memory (RAM).

The above is only partial embodiments of the present disclosure. It should be pointed out that for those of ordinary skill in the art, several improvements and modifications can be made without departing from the principle of the present disclosure, and the improvements and modifications should also be regarded within the scope of the present disclosure.

Accordingly, the present disclosure breaks through the barriers caused by the data complexity formed by the splicing-lamps at the hardware level and the parameter level, and provides users with a more convenient lighting-effect preview solution, thereby guiding users to accurately generate the lighting-effect application package of the target splicing-lamps, thereby improving the efficiency of editing lighting effects by the users and improving the data security of the information presented by the corresponding lighting effects.

What is claimed is:

1. A splicing-lamp lighting-effect application method, comprising:
   displaying a plane composition of a target splicing-lamp, the plane composition including form patterns corresponding to multiple lamp blocks of the target splicing-lamp, and each form pattern including multiple light-emitting areas;
   loading effect configuration information corresponding to each layer described in a lighting-effect template into a lighting-effect editing area for display, the effect configuration information including area information and lighting-effect information, the area information being used to specify an effective light-emitting area of a lamp block, and the lighting-effect information being used to describe a lighting-effect process acting on the effective light-emitting area;
   in response to a layer on-top event, determining and marking the effective light-emitting area in the form pattern of each lamp block in the plane composition according to the area information of a current layer that is set on top, obtaining a plane topological pattern corresponding to the current layer, and applying the lighting-effect information of the current layer to the plane topological pattern to display a preview lighting effect of the current layer; and
   responding to a lighting-effect application instruction, encapsulating edited effect configuration information of each layer in a lighting-effect application package, and pushing the lighting-effect application package to the target splicing-lamp for application.

2. The splicing-lamp lighting-effect application method according to claim 1, wherein the loading effect configuration information corresponding to each layer described in the lighting-effect template into a lighting-effect editing area for display further includes:
   obtaining the lighting-effect template, the lighting-effect template describing the effect configuration information corresponding to multiple layers in a tree-like multi-level data structure, and the effect configuration information of each layer including preset switching control information of the corresponding layer;
   extracting the switching control information in the effect configuration information corresponding to each layer, configuring a multi-layer page control in the lighting-effect editing area, and loading the switching control information of the corresponding layer on each layer page for user editing;
   outputting the preset area information and lighting-effect information in the effect configuration information of each layer to a selection area of the corresponding layer page for display, for user editing; and
   in response to a data editing instruction generated by editing of the effect configuration information, updating the lighting-effect template to latest data state with latest editing data corresponding to the data editing instruction.

3. The splicing-lamp lighting-effect application method according to claim 2, wherein, before responding to the lighting-effect application instruction, the method further includes:
   obtaining the latest editing data of the switching control information in the effect configuration information of each layer set by the user, wherein the switching control information of multiple specific layers limits synchronous application of the multiple specific layers, and the multiple specific layers limit different plane topological patterns; and monitoring whether any one of the multiple specific layers is switched as the current layer, if one of the multiple specific layers is switched as the current layer, according to the area information of the multiple specific layers and the latest editing data of the lighting-effect information, synchronously applying the preview lighting effects of the multiple specific layers in the plane topological pattern corresponding to the multiple specific layers in the plane composition.

4. The splicing-lamp lighting-effect application method according to claim 2, wherein the encapsulating edited effect configuration information of each layer in a lighting-effect application package further includes:

obtaining the latest editing data of the effect configuration information of each layer from the lighting-effect editing area; and formatting the latest editing data into a lighting-effect application package in a tree-like multi-level data structure, wherein the switching control information of each layer is used as a secondary parameter of the effect configuration information.

5. The splicing-lamp lighting-effect application method according to claim 2, wherein, after loading effect configuration information corresponding to each layer described in the lighting-effect template into a lighting-effect editing area for display, the method further includes:

responding to a lighting-effect preview instruction, and generating an execution script acting on the plane composition according to the latest editing data of the effect configuration information of each layer in the lighting-effect editing area;

running the execution script to play the preview lighting effect of each layer in the plane composition according to the latest editing data of the effect configuration information of each layer, wherein a switching order of each layer is controlled by the switching control information of each layer.

6. The splicing-lamp lighting-effect application method according to claim 1, wherein, before loading effect configuration information corresponding to each layer described in the lighting-effect template into a lighting-effect editing area for display, the method further includes:

displaying a template selection interface, and triggering a query request to obtain candidate lighting-effect templates from a cloud server;

obtaining preview information of multiple candidate lighting-effect templates pushed by the cloud server, wherein the preview information includes lighting effect classification information; and classifying and presenting each candidate lighting-effect template in the template selection interface according to the lighting effect classification information, so as to load a selected lighting-effect template for loading and display by the user.

7. A computer device, comprising:

a central processing unit and a memory, wherein the central processing unit is used to call and run a computer program stored in the memory to perform a splicing-lamp lighting-effect application method, the method comprising:

displaying a plane composition of a target splicing-lamp, the plane composition including form patterns corresponding to multiple lamp blocks of the target splicing-lamp, and each form pattern including multiple light-emitting areas;

loading effect configuration information corresponding to each layer described in a lighting-effect template into a lighting-effect editing area for display, the effect configuration information including area information and lighting-effect information, the area information being used to specify an effective light-emitting area of a lamp block, and the lighting-effect information being used to describe a lighting-effect process acting on the effective light-emitting area;

in response to a layer on-top event, determining and marking the effective light-emitting area in the form pattern of each lamp block in the plane composition according to the area information of a current layer that is set on top, obtaining a plane topological pattern corresponding to the current layer, and applying the lighting-effect information of the current layer to the plane topological pattern to display a preview lighting effect of the current layer; and responding to a lighting-effect application instruction, encapsulating edited effect configuration information of each layer in a lighting-effect application package, and pushing the lighting-effect application package to the target splicing-lamp for application.

8. The computer device according to claim 7, wherein the loading effect configuration information corresponding to each layer described in the lighting-effect template into a lighting-effect editing area for display further includes:

obtaining the lighting-effect template, the lighting-effect template describing the effect configuration information corresponding to multiple layers in a tree-like multi-level data structure, and the effect configuration information of each layer including preset switching control information of the corresponding layer;

extracting the switching control information in the effect configuration information corresponding to each layer, configuring a multi-layer page control in the lighting-effect editing area, and loading the switching control information of the corresponding layer on each layer page for user editing;

outputting the preset area information and lighting-effect information in the effect configuration information of each layer to a selection area of the corresponding layer page for display, for user editing; and in response to a data editing instruction generated by editing of the effect configuration information, updating the lighting-effect template to latest data state with latest editing data corresponding to the data editing instruction.

9. The computer device according to claim 8, wherein, before responding to the lighting-effect application instruction, the method further includes:

obtaining the latest editing data of the switching control information in the effect configuration information of each layer set by the user, wherein the switching control information of multiple specific layers limits synchronous application of the multiple specific layers, and the multiple specific layers limit different plane topological patterns; and monitoring whether any one of the multiple specific layers is switched as the current layer, if one of the multiple specific layers is switched as the current layer, according to the area information of the multiple specific layers and the latest editing data of the lighting-effect information, synchronously applying the preview lighting effects of the multiple specific layers in the plane topological pattern corresponding to the multiple specific layers in the plane composition.

10. The computer device according to claim 8, wherein the encapsulating edited effect configuration information of each layer in a lighting-effect application package further includes:

obtaining the latest editing data of the effect configuration information of each layer from the lighting-effect editing area; and formatting the latest editing data into a lighting-effect application package in a tree-like multi-level data structure, wherein the switching control information of each layer is used as a secondary parameter of the effect configuration information.

11. The computer device according to claim 8, wherein, after loading effect configuration information corresponding to each layer described in the lighting-effect template into a lighting-effect editing area for display, the method further includes:

responding to a lighting-effect preview instruction, and generating an execution script acting on the plane composition according to the latest editing data of the effect configuration information of each layer in the lighting-effect editing area;

running the execution script to play the preview lighting effect of each layer in the plane composition according to the latest editing data of the effect configuration information of each layer, wherein a switching order of each layer is controlled by the switching control information of each layer.

12. The computer device according to claim 7, wherein, before loading effect configuration information corresponding to each layer described in the lighting-effect template into a lighting-effect editing area for display, the method further includes:

displaying a template selection interface, and triggering a query request to obtain candidate lighting-effect templates from a cloud server;

obtaining preview information of multiple candidate lighting-effect templates pushed by the cloud server, wherein the preview information includes lighting effect classification information; and classifying and presenting each candidate lighting-effect template in the template selection interface according to the lighting effect classification information, so as to load a selected lighting-effect template for loading and display by the user.

13. A non-transitory computer-readable storage medium, wherein the storage medium stores a computer program in the form of computer-readable instructions for, when the computer program is called and run by a computer, performing a splicing-lamp lighting-effect application method, the method comprising:

displaying a plane composition of a target splicing-lamp, the plane composition including form patterns corresponding to multiple lamp blocks of the target splicing-lamp, and each form pattern including multiple light-emitting areas;

loading effect configuration information corresponding to each layer described in a lighting-effect template into a lighting-effect editing area for display, the effect configuration information including area information and lighting-effect information, the area information being used to specify an effective light-emitting area of a lamp block, and the lighting-effect information being used to describe a lighting-effect process acting on the effective light-emitting area;

in response to a layer on-top event, determining and marking the effective light-emitting area in the form pattern of each lamp block in the plane composition according to the area information of a current layer that is set on top, obtaining a plane topological pattern corresponding to the current layer, and applying the lighting-effect information of the current layer to the plane topological pattern to display a preview lighting effect of the current layer; and responding to a lighting-effect application instruction, encapsulating edited effect configuration information of each layer in a lighting-effect application package, and pushing the lighting-effect application package to the target splicing-lamp for application.

14. The non-transitory computer-readable storage medium according to claim 13, wherein the loading effect configuration information corresponding to each layer described in the lighting-effect template into a lighting-effect editing area for display further includes:

obtaining the lighting-effect template, the lighting-effect template describing the effect configuration information corresponding to multiple layers in a tree-like multi-level data structure, and the effect configuration information of each layer including preset switching control information of the corresponding layer;

extracting the switching control information in the effect configuration information corresponding to each layer, configuring a multi-layer page control in the lighting-effect editing area, and loading the switching control information of the corresponding layer on each layer page for user editing;

outputting the preset area information and lighting-effect information in the effect configuration information of each layer to a selection area of the corresponding layer page for display, for user editing; and in response to a data editing instruction generated by editing of the effect configuration information, updating the lighting-effect template to latest data state with latest editing data corresponding to the data editing instruction.

15. The non-transitory computer-readable storage medium according to claim 14, wherein, before responding to the lighting-effect application instruction, the method further includes:

obtaining the latest editing data of the switching control information in the effect configuration information of each layer set by the user, wherein the switching control information of multiple specific layers limits synchronous application of the multiple specific layers, and the multiple specific layers limit different plane topological patterns; and monitoring whether any one of the multiple specific layers is switched as the current layer, if one of the multiple specific layers is switched as the current layer, according to the area information of the multiple specific layers and the latest editing data of the lighting-effect information, synchronously applying the preview lighting effects of the multiple specific layers in the plane topological pattern corresponding to the multiple specific layers in the plane composition.

16. The non-transitory computer-readable storage medium according to claim 14, wherein the encapsulating edited effect configuration information of each layer in a lighting-effect application package further includes:

obtaining the latest editing data of the effect configuration information of each layer from the lighting-effect editing area; and formatting the latest editing data into a lighting-effect application package in a tree-like multi-level data structure, wherein the switching control information of each layer is used as a secondary parameter of the effect configuration information.

17. The non-transitory computer-readable storage medium according to claim 14, wherein, after loading effect configuration information corresponding to each layer described in the lighting-effect template into a lighting-effect editing area for display, the method further includes:

responding to a lighting-effect preview instruction, and generating an execution script acting on the plane composition according to the latest editing data of the effect configuration information of each layer in the lighting-effect editing area;

running the execution script to play the preview lighting effect of each layer in the plane composition according to the latest editing data of the effect configuration information of each layer, wherein a switching order of each layer is controlled by the switching control information of each layer.

18. The non-transitory computer-readable storage medium according to claim 13, wherein, before loading effect configuration information corresponding to each layer described in the lighting-effect template into a lighting-effect editing area for display, the method further includes:

displaying a template selection interface, and triggering a query request to obtain candidate lighting-effect templates from a cloud server;

obtaining preview information of multiple candidate lighting-effect templates pushed by the cloud server, wherein the preview information includes lighting effect classification information; and classifying and presenting each candidate lighting-effect template in the template selection interface according to the lighting effect classification information, so as to load a selected lighting-effect template for loading and display by the user.

* * * * *